United States Patent [19]
Maeda

[11] Patent Number: 5,355,361
[45] Date of Patent: Oct. 11, 1994

[54] OPTICAL PICKUP APPARATUS FOR REPRODUCING SIGNALS RECORDED ON AN OPTICAL DISK

[75] Inventor: Takanori Maeda, Tokorozawa, Japan

[73] Assignee: Pioneer Electronic Corporation, Tokyo, Japan

[21] Appl. No.: 955,037

[22] Filed: Oct. 1, 1992

[30] Foreign Application Priority Data

Dec. 3, 1991 [JP] Japan .................. 3-319012

[51] Int. Cl.$^5$ ............................... G11B 7/00
[52] U.S. Cl. ..................... 369/120; 369/47; 369/112; 369/58; 369/44.11
[58] Field of Search ............ 369/44.76, 44.41, 44.42, 369/44.23, 44.28, 112, 110, 120, 121; 358/335, 342, 906

[56] References Cited

U.S. PATENT DOCUMENTS

| | | | |
|---|---|---|---|
| 4,353,077 | 10/1982 | Gokey et al. | |
| 5,081,617 | 1/1992 | Gelbart | 309/112 |
| 5,084,858 | 1/1992 | Maeda | 369/44.41 |
| 5,146,445 | 9/1992 | Nakamura et al. | 369/44.41 |
| 5,224,082 | 6/1993 | Kurokawa et al. | 369/44.23 |

FOREIGN PATENT DOCUMENTS

| | | |
|---|---|---|
| 2120001 | 11/1983 | European Pat. Off. |
| 8501818 | 4/1985 | European Pat. Off. |

*Primary Examiner*—Aristotelis Psitos
*Assistant Examiner*—Muhammad N. Edun
*Attorney, Agent, or Firm*—Sughrue, Mion, Zinn, Macpeak & Seas

[57] ABSTRACT

An optical pickup apparatus reproduces signals recorded on an optical disk, which has a signal track in which a plurality of signal pit strings are arranged in a circumferential direction of the optical disk, each of the signal pit strings including a plurality of signal pits arranged in a line in a radial direction of the optical disk, the optical disk being rotated at a speed v relative to the optical pickup apparatus. The optical pickup apparatus is provided with: a device for projecting a light spot onto at least one signal pit string of the optical disk; a lens for converging a reflected light from the signal pit string and for forming a linear image of the signal pit string at a magnification m; and a one-dimensional scan type photodetector device having a plurality of photoelectric elements arranged in a line and located in an image forming position of the lens, for sequentially scanning, at a scanning speed s, the linear image by the photoelectric elements and for sequentially generating signals of the photoelectric elements. The photoelectric elements are arranged at an angle $\theta$ with respect to the direction of the linear image, the angle $\theta$ being prescribed as follows:

$$\theta = \sin^{-1}(mv/s).$$

10 Claims, 5 Drawing Sheets

OPTICAL PICKUP APPARATUS FOR REPRODUCING SIGNALS RECORDED ON AN OPTICAL DISK

BACKGROUND OF THE INVENTION

1. Field of the Invention

The present invention generally relates to an optical pickup apparatus that reproduces signals recorded on an optical disk, which is an optical recording medium for recording signals, such as video information. More particularly, the present invention is concerned with an optical pickup apparatus which reproduces signals recorded on an optical disk provided with a plurality of signal pit strings in each of which a plurality of pits are arranged in the radial direction of the optical disk.

2. Description of the Related Art

It is desirable that information be more rapidly reproduced as an increased amount of information is recorded on the optical disk. Particularly, it is necessary to use a broadband recording and reproducing system capable of recording and reproducing high-frequency signals in order to record and reproduce information used in a high definition television system on and from optical disks. In order to realize such a broadband recording and reproducing system, it may be attempted to more finely record information on the optical disk, and read an increased number of pits per unit time, or per unit length.

However, in such an attempt, the fine recording of information needs a shorter minimum pit length on the optical disk. In order to reproduce thus recorded pit images at a required resolution level, it becomes necessary to broaden a spatial frequency band of the optical pickup apparatus used for reproduction. For this requirement, it is necessary to shorten the wavelength of the light source or increase the numerical aperture of the objective lens.

The currently available semiconductor laser devices cannot emit light having such a required wavelength. Thus, it becomes necessary in this case to use a gas laser or a laser using a non-linear optical element. Consequently, the cost and size of the optical pickup apparatus get increased. On the other hand, an increased numerical aperture needs a flatter optical disk or an optical disk having a uniform disk surface. However, it is very difficult to produce such optical disks. As a result, it is very difficult to broaden the spatial frequency band for reproduction.

It may be possible to rotate the optical disk at a higher speed in order to reproduce signals in a high-frequency band. However, it is necessary to use a more powerful motor for rotating the optical disk. In addition, it is difficult to control the focusing position following an increased revolution of the motor.

The optical pickup apparatus may include a lateral single mode semiconductor laser, and a photodetector. In this case, the semiconductor laser serves as a point light source, which has a light emitting point having a diameter of approximately 0.1 μm, for example. A half mirror may be disposed in the optical path of the semiconductor laser to separate a projection light directed to an optical disk and a reflected light therefrom from each other, while an objective lens is provided to focus the projection light onto the optical disk, and collect the reflected light therefrom. The photodetector is positioned to detect the reflected light. In such a construction, the laser beam emitted from the semiconductor laser is reflected by the half mirror, and forms an image on a recording plane of the optical disk by means of the objective lens. The wavelength γ of the semiconductor laser and the numerical aperture NA are selected such that γ/NA is greater than 0.1 μm. Hence, the size of the spot on the optical disk is limited to γ/NA due to a diffraction limit.

As has been described previously, information is recorded on the optical disk in the form of pits, which cause optical change. By way of example, the pits formed on the recording plane cause a change in the refractive index. The recording of information is performed by sensitizing pigment contained in a recording film or changing the state of the recording film to a crystal state or an amorphous state. In the above manners, areas having different refractive index values are formed on the recording plane. The reflected light from the above recording plane has different intensity levels due to the differences in the refractive index. Then, the reflected light is converged by the objective lens. Some portion of the reflected light passes through the half mirror. At this time, the half mirror may be adapted to cause the reflected light to have an astigmatic characteristic. That is, the reflected light from the half mirror has different converting positions in the longitudinal and lateral directions of the light axis. The photodetector is located between the different converging positions.

It is necessary to reduce the distance between adjacent signal tracks in order to increase the signal recording density in the optical pickup apparatus as described above. As the distance between adjacent signal tracks reduces, the light spot formed on a signal track is more affected by a change in the reflectance of adjacent signal tracks. Hence, leakage of light from the adjacent signal tracks takes place, and the S/N ratio of the reproduced signal is degraded.

Japanese Patent Application Laid-Open Publication No. 57-58,248 discloses a high-density reading method, in which a plurality of light sources are used. Three adjacent signal tracks are projected at once by these light sources, and far-field patterns respectively formed by the light sources are detected by photodetectors. The output signals of the photodetectors corresponding to the respective far-field patterns are mutually subtracted from each other in accordance with a leak rate measured beforehand. Using the results of the above calculation, the quantity of leakage can be reduced. However, the above method needs a light spot having a size corresponding to the diffraction limit. If the interval between the adjacent signal tracks is smaller than the limited size of the light spot, the influence of the outer signal track will increase significantly. As a result, this reading method does not bring about great improvement.

As described above, it is very difficult to improve the information recording density on the optical disk by narrowing the distance between adjacent signal tracks.

SUMMARY OF THE INVENTION

It is therefore an object of the present invention to provide optical pickup apparatus which can reproduce signals on an optical disks efficiently at a high bit rate.

According to the present invention, the above-mentioned object can be achieved by an optical pickup apparatus for reproducing signals recorded on an optical disk, which has a signal track in which a plurality of signal pit strings are arranged in a circumferential direction of the optical disk, each of the signal pit strings including a plurality of signal pits arranged in a line in a radial direction of the optical disk, the optical disk being rotated at a speed v relative to the optical pickup apparatus. The optical pickup apparatus is provided with: a device for projecting a light spot onto at least one signal pit string of the optical disk; a lens for converging a reflected light from the signal pit string and for forming a linear image of the signal pit string at a magnification m; and a one-dimensional scan type photodetector device having a plurality of photoelectric elements arranged in a line and located in an image forming position of the lens, for sequentially scanning, at a scanning speed s, the linear image by the photoelectric elements and for sequentially generating signals of the photoelectric elements. The photoelectric elements are arranged at an angle $\theta$ with respect to the direction of the linear image, the angle $\theta$ being prescribed as follows:

$$\theta = \sin^{-1}(mv/s).$$

According to the present invention, a scan type photodetector can be used, and it is possible to output serial data corresponding to the signal pit strings without a parallel-to-serial converter. Here, the information can be recorded in a broader frequency band, and the reading operation can be performed at high speed since a plurality of signal pits are optically read at one time.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

Figure 1:
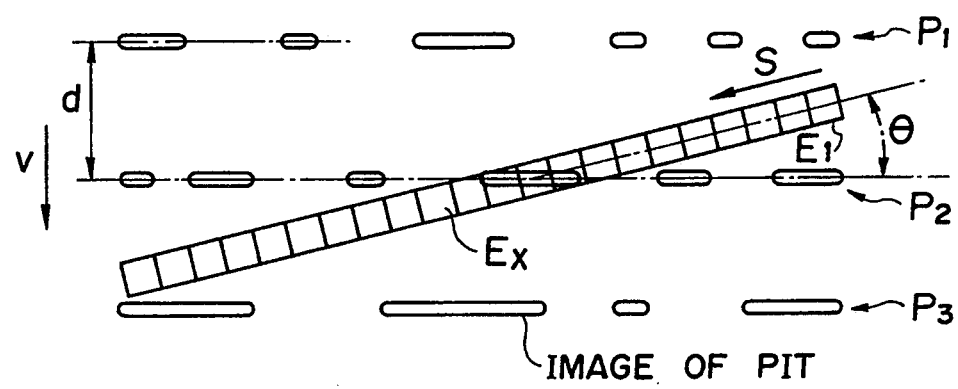
FIG. 1 is a diagram showing the principle of the present invention.

FIG. 1 shows the principle of the present invention. An optical pickup apparatus as one embodiment of the present invention reproduces signals recorded on an optical disk, which moves at a relative velocity v and includes a plurality of turns of a signal track on which a plurality of signal pit strings each having a predetermined length are arranged in a circumferential direction of the optical disk. Each of the signal pit strings includes a plurality of pits arranged in a line in the radial direction of the optical disk. As will be described later in detail, the optical pickup apparatus of the present invention is provided with a light spot projection unit, an image forming lens, and a one-dimensional scan type photodetector. The light spot unit sequentially projects a linear light spot, which extends in the radial direction of the optical disk along the signal pit string, onto the signal pit strings. The image forming lens converges light reflected by the signal pit strings onto which the light spot is projected, and respectively forms linear images P1, P2 and P3 at a magnification m. The one-dimensional scan type photodetector includes a plurality of photoelectric elements Ex, which are arranged in a line and respectively have light-receiving planes located in an image formation position of the reflected linear light. The photoelectric elements Ex are sequentially scanned at a scanning speed s, and the photo-electrically converted output signals thereof are sequentially outputted. The photoelectric elements Ex are arranged so that the linear arrangement of the light-receiving planes thereof is inclined at an angle $\theta = \sin^{-1}(mv/s)$ with respect to a longitudinal direction of each of the linear images P1, P2 and P3, which corresponds to the direction of the linear arrangement of each signal pit string.

The optical pickup apparatus projects the linear optical spot onto the signal pit strings of the predetermined length, each including pits arranged in the radial direction of the optical disk 10. As shown in FIG. 1, the linear images P1, P2 and P3 respectively formed by converging the lights reflected by the above signal pit strings by means of the image forming lens are received by the one-dimensional scan type photodetector, which sequentially generates electric signals. During this operation, the photoelectric elements Ex of the one-dimensional scan type photodetector are sequentially scanned at the scanning speed s. As described above, the linear arrangement of the photoelectric elements Ex is inclined at an angle $\theta = \sin^{-1}$ (mv/s). In the present embodiment, the scanning operation is started when the photoelectric element E1 at one end of the photodetector receives the linear image for the first time, so that the linear image is detected as the scanned element Ex is always positioned at the intersection of the linear image and the photodetector of the linear shape, while the photoelectric elements Ex are relatively moved. Accordingly, the read signals from the one-dimensional scan type detection unit become serial read data.

Figure 2A:
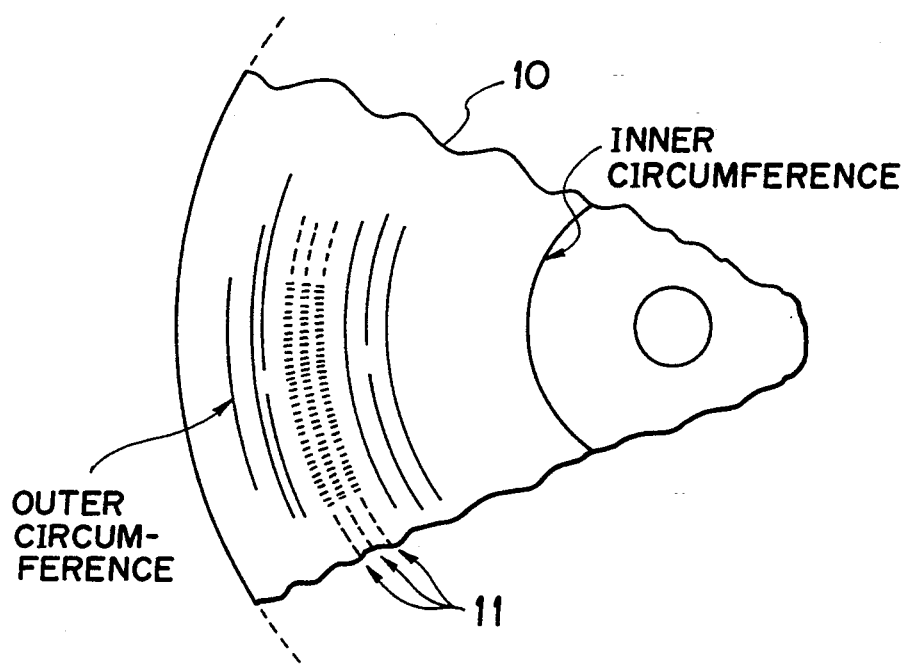
FIGS. 2A and 2B are diagrams showing a signal recording format of an optical disk that is optically read by an optical pickup apparatus of the present invention.
Figure 2B:
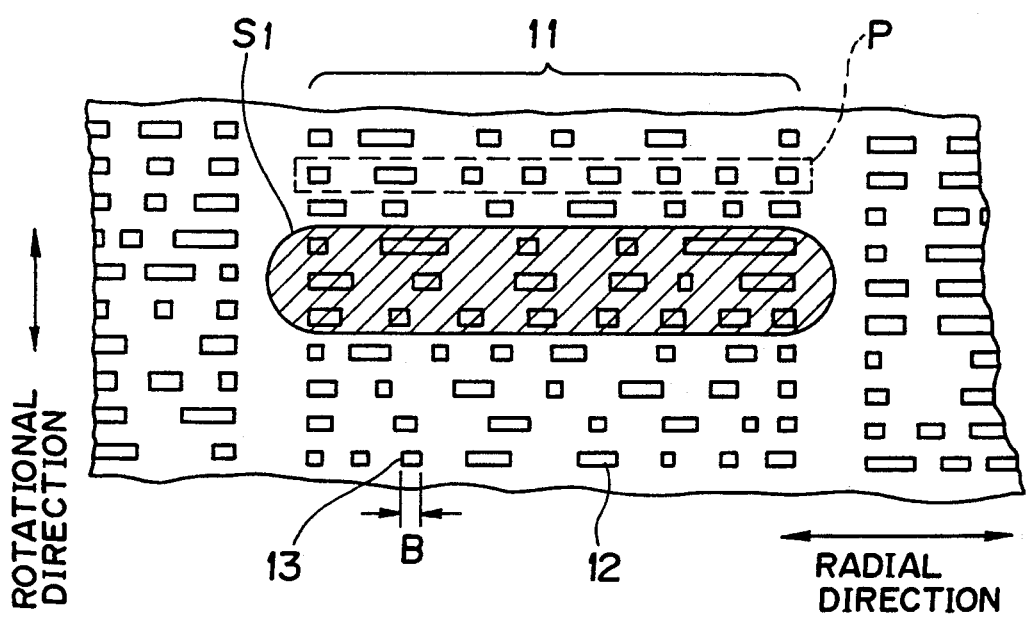

FIGS. 2A and 2B schematically illustrate a signal recording format of an optical disk according to the embodiment of the present invention. More specifically, FIG. 2A shows a part of an upper plane of an optical disk 10 on which signal tracks are formed, and FIG. 2B shows some enlarged signal tracks.

As shown in FIG. 2A, a plurality of turns of a signal track 11 are spirally formed on the disk plane so that the spiral signal track 11 gradually expands from the inner circumference to the outer circumference. The signal track 11 includes signal pit strings arranged on the spiral signal track 11 in the circumferential direction.

As shown in FIG. 2B, each of the signal pit strings P has a predetermined length that defines the width of the signal track 11, and includes a plurality of pits arranged in a line in the radial direction of the optical disk 10. The signal track 11 offers a signal read position for accessing in the radial direction by means of a tracking mechanism of the optical pickup apparatus, as will be described later.

In FIG. 2B, reference numeral 12 indicates a pit corresponding to information recorded on the optical disk 10, and reference numeral 13 indicates the period of one information clock i.e. a clock length B as a unit information piece. The length of each pit 12 and the length of each non-pit portion in the radial direction are respectively determined as being an integer multiple of the clock length B.

The pit portions and non-pit portions have mutually different reflectance values. The differences in the reflectance are made by selectively sensitizing the pigment of the disk so that sensitized portions and non-sensitized portions are formed on the disk plane or by selectively changing the status of the disk plane so that crystal portions and amorphous portions are created. The area between the adjacent turns of the signal track 11 does not have any pits, so that the adjacent turns of the signal track 11 are separated from each other. The area between the adjacent turns of the signal track 11 has a high reflectance value for track identification.

In FIG. 2B, S1 indicates a light spot projected onto three consecutive signal pit strings P. The light spot S1 is depicted as a hatched area in FIG. 2B. During the reading operation, the light spot S1 is projected onto the optical disk 10, while the optical disk 10 is being rotated.

Figure 3:
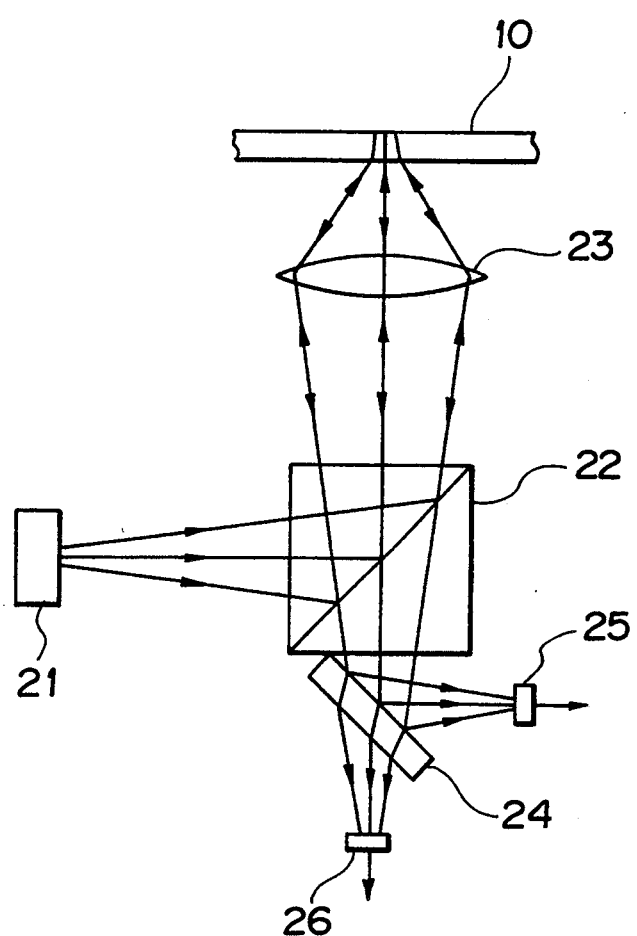
FIG. 3 is a diagram of an optical pickup apparatus as one embodiment of the present invention.

FIG. 3 shows the construction of the optical pickup apparatus of the present embodiment being considered.

In FIG. 3, the optical pickup apparatus is provided with a linear light source 21, a beam splitter 22, an objective lens 23, a parallel plate 24, a photodetector 25 for use in an RF detection, and a photodetector 26 for use in servo control.

The linear light source 21 has a light-emitting diode for forming a linear light source image. The beam splitter 22 splits a light from the linear light source 21 into a light directed to the optical disk 10 and a reflected light from the optical disk 10. The objective lens 23 projects the linear image formed by the linear light source 21 onto the optical disk 10 and forms an image of the reflected light from the optical disk 10 by a predetermined magnification m. The parallel plate 24 splits the reflected light into two light components, and causes one of the two light components to have an astigmatic characteristic.

The photodetector 25 for use in the RF detection is positioned so that the reflection light to which the astigmatism characteristic is not given is detected at an image forming position. The photodetector 26 for use in servo control receives a far-field pattern of the reflected light to which the astigmatic characteristic is given by the parallel plate 24. The photodetector 26 for use in servo control has plurally divided photodiodes, for example, three, four or six divided photodiodes, and generates servo control signals used for tracking control and focusing control by receiving the light reflected by the optical disk 10 by means of the divided photodiodes.

The optical pickup apparatus shown in FIG. 3 is arranged for an optical information reproducing system or an optical information recording and reproducing system, and is movably positioned in the radial direction of the optical disk 10 by means of a tracking mechanism (not shown). The position of the optical pickup apparatus in the radial direction is determined by detecting error signals regarding focusing and track position. The above positioning control of the optical pickup apparatus can be performed in a conventional manner, and hence the description thereof will be omitted here.

While the above-mentioned optical pickup apparatus reads information recorded on the optical disk 10, the optical disk 10 is being rotated by means of a spindle motor (not shown) so that the relative velocity between the recording plane of the optical disk 10 and the optical pickup apparatus is kept to be a constant velocity v (m/sec). During the reading operation, the linear light spot S1 is projected, by virtue of the linear light source 21 and the objective lens 23, onto the optical disk 10, as shown in FIG. 2B. The light spot S1 shown in FIG. 2B is projected on an area covering three consecutive signal pit strings. It is desirable that the light spot S1 is most efficiently projected onto an area in view of the light-receiving condition on the photodetector 25 for use in the RF detection. Thus, just one signal pit string may be covered by the optical spot at one time or more than three signal pit strings may be covered by the optical spot at one time. The light forming the light spot reflected by the three consecutive signal pits is converged by the objective lens 23, and forms the linear images P1, P2 and P3 of the signal pit strings as shown in FIG. 1. Then, the photodetector 25 for use in the RF detection reads the linear images P1, P2 and P3.

A description will now be given, with reference to FIGS. 1 and 4, of the structure of the photodetector 25 for use in the RF detection and the positioning direction thereof.

Figure 4:
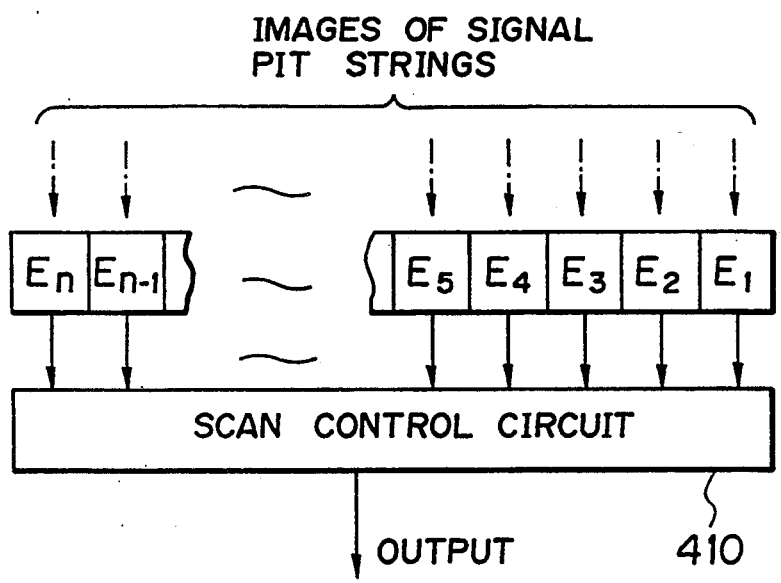
FIG. 4 is a diagram showing the structure of a photodetector for use in an RF detection.

As shown in FIG. 4, the photodetector 25 for use in the RF detection is provided with n photoelectric elements E1–En, and a scan control circuit 410, which sequentially scans the photoelectric elements E1–En and outputs electric signals. The photoelectric elements E1–En are arranged in a line, and the respective light-receiving planes thereof are located in the image forming position of the objective lens. Each photoelectric elements of E1–En consists of, for example, a CCD (Charge-Coupled Device). Further, as shown in FIG. 1, the linear arrangement of the photoelectric elements E1–En are inclined at an angle $\theta$ with respect to the direction in which the linear images P1, P2 and P3 formed by the light reflected by the three consecutive signal pit strings run. The images of the signal pits on the optical disk 10 are formed, by virtue of the objective lens 23, on the light-receiving planes at the magnification m of the optical disk 10. The scan control circuit 410 scans the photoelectric elements E1–En at the scanning speed s (m/sec) in order to read the images formed on the light-receiving planes.

The angle $\theta$, the scanning speed s, the relative velocity v, and the image forming magnification m, are selected so as to satisfy the following formula:

$$\sin \theta = mv/s.$$

When the above formula is satisfied, the speed at which the linear images formed by the reflected light from the signal pit lines cross across the photoelectric elements E1–En becomes equal to the scanning speed s. In this embodiment, the scan control circuit 410 is adapted to start the scanning when the linear image of the pit located at one end of one of the signal pit lines has been received by the photoelectric element E1, so that the linear images of the signal pit lines can be sequentially read by the photoelectric elements E1–En. Thus, a time-series signal which is serial data can be outputted from the scan control circuit 410.

Figure 5:
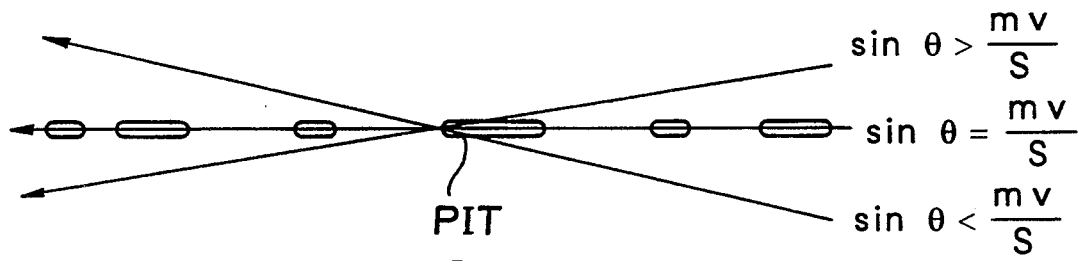
FIG. 5 is a diagram showing scanning by photoelectric elements used in the embodiment of the present invention.

In other words, when the angle $\theta$ of the photoelectric elements E1–En is selected as follows:

$\sin\theta > mv/s$ or
$\sin\theta < mv/s$ the loci of the reading position on the optical disk 10 are as shown in FIG. 5. If the read signal along either one of the oblique loci shown in FIG. 5 is outputted in the form of a time-series signal, it will have components which relate to a plurality of signal pit strings or which include signal generated between the signal pit strings. Hence a complex process will be necessary to separate thus read signal of the target signal pit string from other signals.

By setting the angle $\theta$ such that $\theta = \sin^{-1}(mv/s)$ in the present embodiment, the time-series read signal can be controlled to have components which only relate to one signal pit string or which relate to a plurality of signal pit strings but are separated from each other at a sufficient interval. Accordingly, it becomes easy to discriminate the signals relating to the signal pit strings from each other and substantially obtain a large linear velocity at a small revolution of the optical disk 10.

A description will now be given of other embodiments of the present invention.

In the above-mentioned embodiment, the relationship between a pitch d of the adjacent signal pit strings on the optical disk 10 (as shown in FIG. 1) and an effective length l of the photoelectric elements E1 –En, is not specified. The effective length l is the distance from one end of a photoelectric element to another end. In one aspect of the present embodiment, this relationship between the pitch d and the effective length l is prescribed as follows:

$$\sin < md/l$$

In this case, the information on only one signal pit string will be received by the photoelectric elements E1–En at one time. Hence, it is possible to perform the substantial scan operation by use of a PSD or the like, in a rather simple manner.

At this time, it is possible to arbitrarily select the scanning speed s at which the photoelectric elements E1–En are scanned as long as the above condition as for the pitch d and the length l is satisfied. As the scanning speed s is increased, a larger quantity of information on the signal pit strings can be obtained. Hence, it becomes possible to more precisely read information on the signal pit string recorded on the optical disk by using a spatial filtering technique or the like.

Alternatively, in another aspect of the present embodiment, the scanning speed s is prescribed as follows:

$$s = lv/(md)$$

In this case, the information concerning some signal pit strings can be read per scan. Thus, the information on the signal pit string can be efficiently read only by giving a trigger signal to start the scanning operation when the information concerning the signal pit string has reached the end of the linear arrangement of the photoelectric elements E1–En.

In the aforementioned embodiment, the pits recorded on the optical disk 10 cause a change in the reflectance. This is of a so-called amplitude grating type. In another embodiment of the present invention, a so-called phase grating type recording system in which pits are recesses or projections formed on the optical disk, can be utilized instead of the amplitude grating type.

In the aforementioned embodiments, the photodetector 25 for use in the RF detection is disposed in the image forming position of the reflected light. Alternatively, it is possible to position the photodetector 25 in a one-side focusing position of the light component to which the astigmatism characteristic has been given, because it is enough to detect the reflected light forming an image formed in the linear image distributing direction. In this case, the image on the detecting plane of the photodetector is not linear but circular or elliptical.

In the aforementioned embodiment, the direction of the signal pit string is set to be the radial direction of the optical disk. Instead, in another embodiments of the present invention, signal recording formats as shown in FIGS. 6A and 6B are utilized.

Figure 6A:
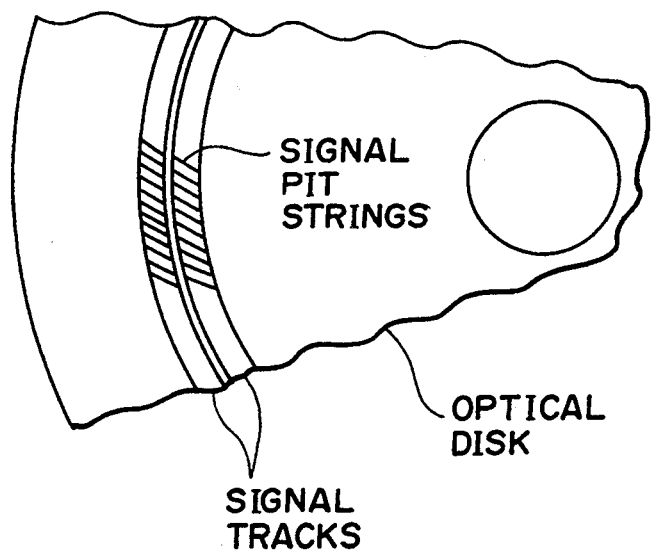
FIGS. 6A and 6B are diagrams showing other signal recording formats used in another embodiment of the present invention.

In the signal recording format shown in FIG. 6A, the signal pit strings on the signal track are obliquely arranged at a predetermined angle with respect to the radial direction of the optical disk.

Figure 6B:
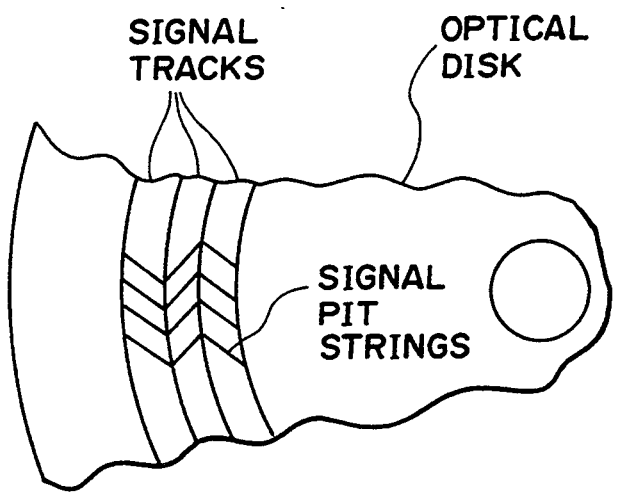

In the signal recording format shown in FIG. 6B, the signal pit strings on the adjacent signal track turns are obliquely arranged at different angles. The signal recording format shown in FIG. 6B does not have a non-signal area between the signal track turns.

Further, it is possible to utilize such a format that the signal pit string is arranged in the circumferential direction of the optical disk, while scanning the signal pit string in the radial direction of the optical disk. In this case, the optical pickup apparatus can be also constructed such that the relative angle $\theta$ between the line image of the signal pit string and the alignment direction of the photoelectric elements, satisfies the relationship of $\theta = \sin^{-1}(mv/s)$ to bring the advantages as aforementioned.

In the aforementioned embodiment, the direction in which the photoelectric elements E1–En are aligned with respect to the direction of the line image formed of the signal pit string is determined as the angle $\theta$ by taking into account the image forming magnification m of the objective lens, the relative velocity v, and the scanning speed s. In case that the photoelectric elements each have a certain width, the position of the reference line indicating the alignment direction of the photoelectric elements and defining the angle $\theta$ can be changed within a range in which the signal derived from the reflected light of the signal pit strings can be detected by the photoelectric elements.

In the above-mentioned embodiments, it is not necessary for the relative velocity v between the recording plane of the optical disk and the optical pickup apparatus to be kept constant. If the optical disk is rotated so that a fixed angular velocity can be obtained, it is desirable to change the relative velocity v on the basis of the position in the radial direction. In this case, it is possible to read the signal pit strings as series data by controlling the scanning speed s of the photoelectric elements so that $s = mv/\sin \theta$.

According to the present invention, a scan type photodetector can be used, and it is possible to output serial data corresponding to the signal pit strings without a parallel-to-serial converter.

A copending patent application, assigned to the same assignee as the present application, discloses a structure in which information is read in parallel form for each signal pit string P shown in FIG. 2B. However, in this structure, a scan type photodetector element, such as a CCD (Charge-Coupled Device), cannot be used to read information recorded on the optical disk. Hence, if it is required that the read signal be processed in serial form, a parallel-to-serial converter is needed. On the contrary, the present invention does not need such a serial-to-parallel converter.

Further, the present invention has the following advantages. Namely, information can be recorded in a broader frequency band due to improvements in the signal recording format and the signal reading manner. The read operation can be performed at high speed since a plurality of signal pit strings are optically read at one time. The light source can be formed with a less-expensive light source, such as a light-emitting diode. Thus, it is not necessary to use an expensive semiconductor laser and a laser resonator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup apparatus for reproducing signals recorded on an optical disk having a signal track in which a plurality of signal pit strings are arranged in a circumferential direction of said optical disk, each of said signal pit strings including a plurality of signal pits arranged in a line in a radial direction of said optical disk, said optical disk being rotated at a speed v relative to said optical pickup apparatus, said optical pickup apparatus comprising:

means for projecting a light spot onto at least one signal pit string of said optical disk;

a lens for converging a reflected light from the signal pit string and for forming a linear image of the signal pit string at a magnification m; and photodetector means having a plurality of photoelectric elements arranged in a line and located in an image forming position of said lens, for sequentially scanning, at a scanning speed s, the linear image by said photoelectric elements and for sequentially generating signals of the photoelectric elements, said photoelectric elements being arranged at an angle $\theta$ with respect to the direction of said linear image, said angle $\theta$ being prescribed as follows:

$$\theta = \sin^{-1}(mv/s),$$

said photodetector means comprising a control means for starting to scan the linear image by said photoelectric elements when one end of the linear image crosses over one end of said photoelectric elements.

2. An optical pickup apparatus as claimed in claim 1, wherein an effective length l of said photoelectric elements and a pitch d of adjacent signal pit strings are prescribed as follows:

$$s = lv/(md).$$

3. An optical pickup apparatus as claimed in claim 1, wherein an effective length Q of said photoelectric elements and a pitch d of adjacent signal pit strings, are prescribed as follows:

$\sin \theta < md/l$.

4. An optical pickup apparatus as claimed in claim 1, further comprising a beam splitter for orienting the light from said projecting means to said optical disk and orienting the reflected light from said optical disk to said photodetector means.

5. An optical pickup apparatus as claimed in claim 4, wherein said beam splitter is adapted to reflect the light from said projecting means toward said optical disk and pass the reflected light therethrough to said photodetector means.

6. An optical pickup apparatus as claimed in claim 1, further comprising:

a parallel plate for splitting the reflected light from said lens into two components and for causing one of said two components to have an astigmatism characteristic; and a photodetector for receiving a far-field pattern of said one of said two components and generating a servo control signal.

7. An optical pickup apparatus as claimed in claim 1, wherein said projecting means is adapted to project the light spot which simultaneously covers three signal pit strings.

8. An optical pickup apparatus as claimed in claim 1, wherein said projecting means comprises a linear image light source.

9. An optical pickup apparatus as claimed in claim 8, wherein said linear image light source comprises a light emitting diode.

10. An optical pickup apparatus as claimed in claim 1, wherein said photoelectric elements comprise a CCD (Charge-Coupled Device).

* * * * *